Oct. 25, 1927.
L. H. PECK
1,646,419
SWITCH FOR AUTOMOBILE SIGNAL LAMPS
Filed Dec. 30, 1921
3 Sheets-Sheet 1
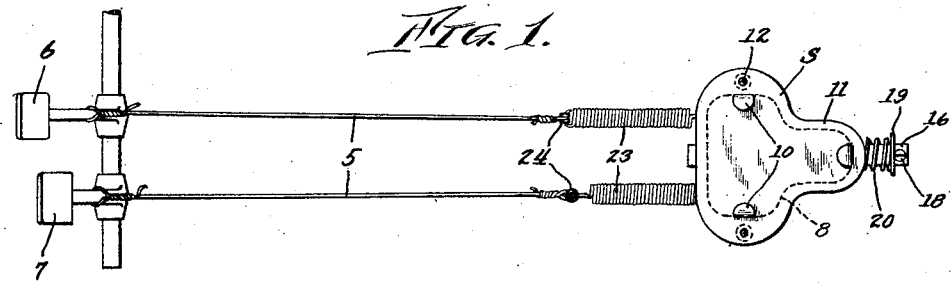
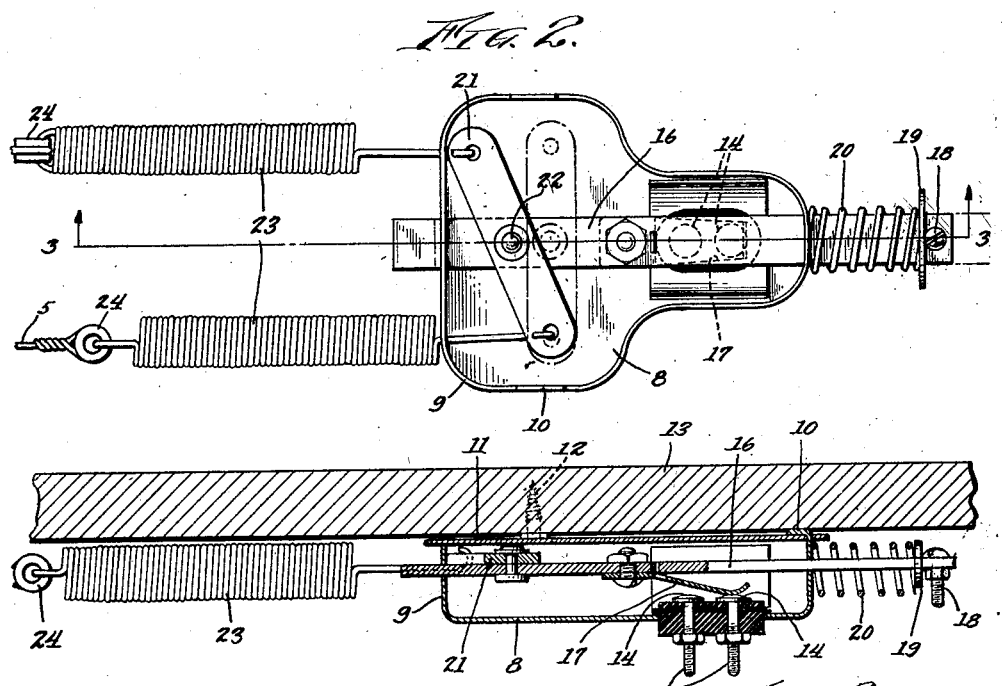
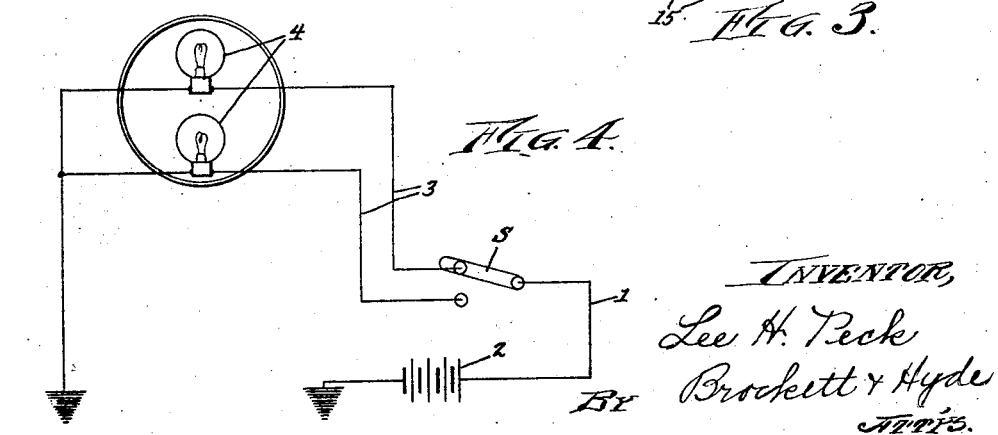
INVENTOR,
Lee H. Peck
BY Brockett & Hyde
Attys.

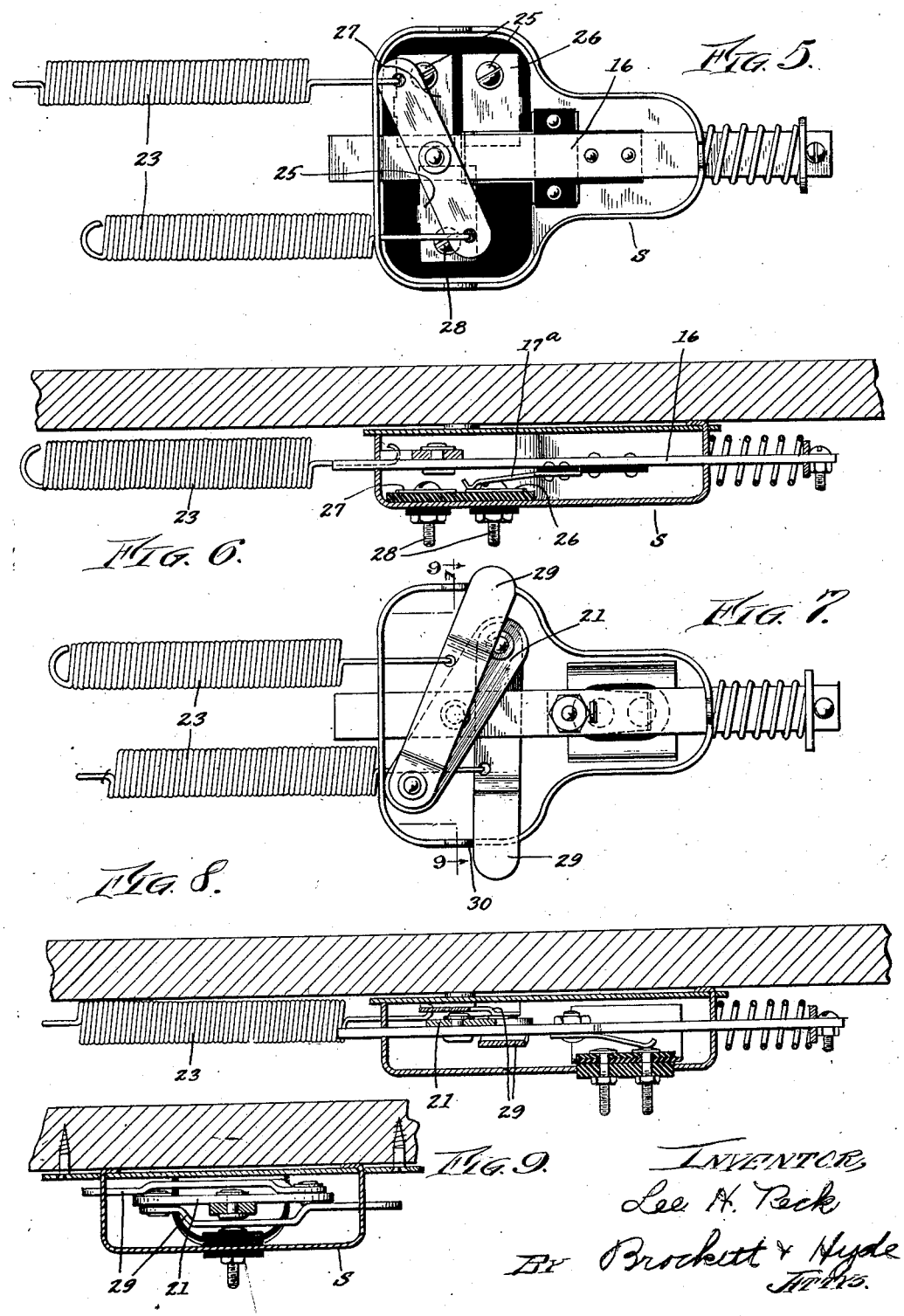

Patented Oct. 25, 1927.

1,646,419

UNITED STATES PATENT OFFICE.

LEE H. PECK, OF CLEVELAND, OHIO.

SWITCH FOR AUTOMOBILE SIGNAL LAMPS.

Application filed December 30, 1921. Serial No. 525,833.

This invention relates to electric switches for use in connection with automobile signal systems.

The object of the invention is to provide a simple and improved switch capable of actuation by one or both of two of the control devices of a motor vehicle to produce two distinct signals for a following driver, such for example as the words "Slow" and "Stop".

A further object of the invention is to provide a switch of this kind which may be operated by comparatively small movement of the vehicle control devices, which can be easily attached to the vehicle, which encloses and protects the switch parts from dirt and weather conditions, and which has other advantages as will appear more fully hereafter.

The invention comprises the switch hereinafter described and claimed.

Figure 10:
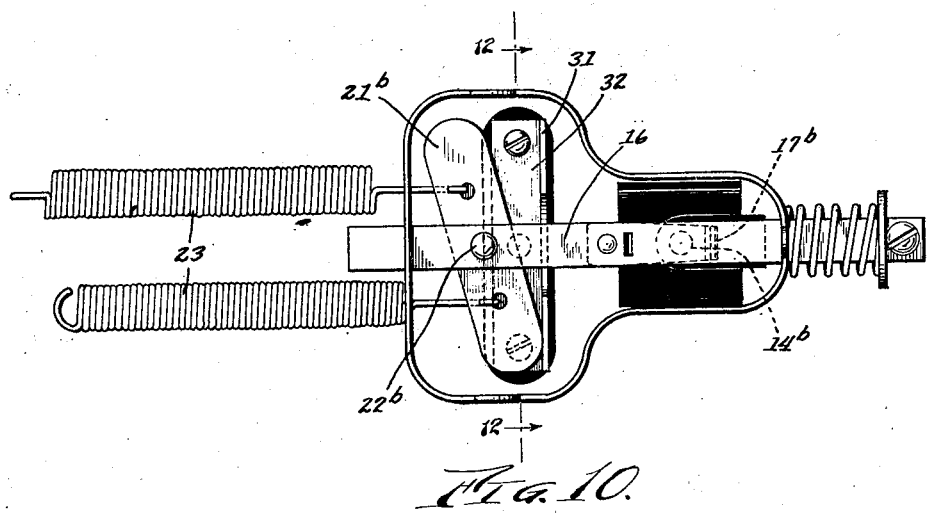
Figure 11:
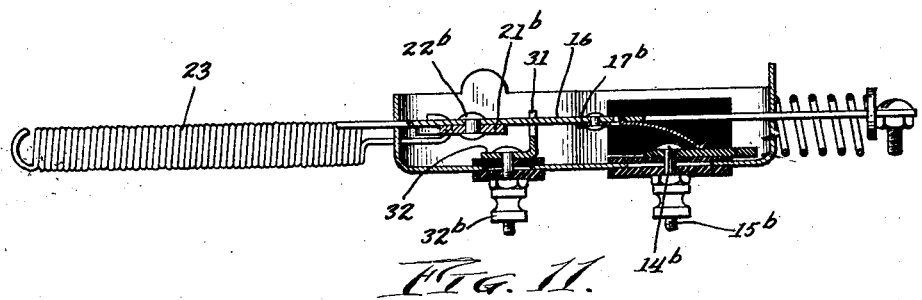
Figure 12:
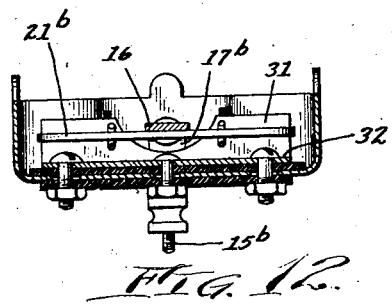

In the drawings Fig. 1 represents a plan view of a switch embodying the invention and showing the same connected to two control devices of the motor vehicle; Fig. 2 is a plan view of the switch, on a larger scale, with the cover omitted to expose interior parts; Fig. 3 is a longitudinal section on the line 3—3, Fig. 2; Fig. 4 is a diagrammatic view illustrating one signaling system in which the invention may be used; Figs. 5 and 6 are views corresponding to Figs. 2 and 3, but illustrating another embodiment of the invention; Figs. 7 and 8 are similar views illustrating another modification; Fig. 9 is a cross section on the line 9—9, Fig. 7; Figs. 10, 11 and 12 are views corresponding to Figs. 7, 8 and 9 and illustrating still another form of the invention.

The switch forming the subject matter of the present application is capable of use in many different forms of automobile signaling system but is primarily designed for use in controlling the electric circuits to either of two signaling devices, such as lamps illuminating two different signals. Said switch may be actuated, for example, by any two or even more of the following devices, to wit, the clutch pedal or mechanism actuated thereby, the service brake, the emergency brake, the throttle pedal or hand lever or parts operated thereby, or the steering wheel or mechanism. According to one suitable arrangement, illustrated in Figs. 1 and 4 the signaling system comprises a circuit 1 connected to the battery 2, said circuit including two parallel or branch circuits 3 each containing a signaling lamp 4. In the circuit is a switch, marked S, which is the switch hereafter described in detail and by actuation of which either one of the two branch circuits 3 may be closed to illuminate the corresponding lamp 4. Each of said lamps illuminates a lens (not shown) provided with some special indicating means, such as the words "Slow", "Stop", "Right", "Left", or the like. In the present application it may be assumed that the two lamps 4 indicate "Slow" and "Stop".

Referring now to Fig. 1, the switch S is actuated by flexible connections, such as the cables or wires 5, connected to two of the control devices of the vehicle, such as the service brake pedal 6 and the clutch pedal 7. As will appear, depression of either one of said pedals actuates the switch S to produce the "slow" signal, while the depression of both pedals simultaneously actuates the switch to produce the "stop" signal. The switch S, one form of which is shown in detail in Figs. 2 and 3, comprises a suitable base or frame portion 8 shown as a hollow box, the rim or wall 9 of which is provided with ears 10 passing through slots in a cover plate 11 and bent over to secure the box and cover together. Screws 12 are passed through openings in the cover into a suitable support on the vehicle, such as one of the floor boards 13. In the box or casing are located two contacts 14 insulated from said casing and having exposed terminals 15 to which the branch circuit wires 3 are connected. Above said contacts is located a bar member 16 sliding through openings in the casing and provided with a spring contact 17. One end of said bar carries a terminal 18 for the main circuit wire 1 and also a suitable abutment, such as a washer 19, for the compression spring 20 which normally moves the bar 16 to the right in Fig. 3. In the larger part of the casing the bar 16 is provided with a transversely extending equalizing lever 21 loosely pivoted at 22 to said bar and to the opposite arms of which are connected tension springs 23 connected to the two wires 5 before referred to.

The normal position of the parts, with both branch circuits 3 open, is indicated in dotted lines, Fig. 2. In this position the spring contact 17 lies to the right of both of the contacts 14; the lever 21 is truly transverse and both pedals 6 and 7 are up or released. When either pedal 6 or 7 alone is depressed the lever 21 is tilted about one of its ends as a fulcrum against the resistance of the other spring 23 to the full line position, Fig. 2. This operation moves the spring contact 17 to the first cooperating contact 14 and closes the circuit through one of the lamps 4. If the other pedal 6 or 7 is then depressed, or if both pedals 6 and 7 are depressed simultaneously, the bar 16 is moved to the left an additional step, so that lever 21 lies truly transverse but to the left of its original position and the spring contact 17 engages the second contact 14, thereby closing the circuit 3 to the second lamp 4 to produce a different signal. If the first lamp 4 illuminates the word "Slow" and the second the word "Stop" the effect is to produce a "slow" signal whenever either the clutch or brake alone is actuated and a "stop" signal when both are actuated.

In the construction shown in Figs. 2 and 3 the switch is what may be called a "live" switch. In other words, the circuit includes parts in conducting relation with the casing and cover. Therefore, the switch casing should be carried by a wooden floor board 13 or if connected to a metal part of the frame should be insulated therefrom. Also insulating washers 24 should be inserted in the cables 5.

Figs. 5 and 6 show what may be called a "dead" switch, to wit, one in which the circuit does not include any parts in conducting relation with the casing, cover or pull wires. In this arrangement the bar 16 is mounted and is actuated in the same manner as in the form before described. It carries a spring contact 17$^a$ insulated from said bar, said spring contact being of sufficient width to bridge the gap between a contact 25 and either of two contacts 26, 27, said contacts 25, 26 and 27 being all mounted in the bottom of the box and insulated therefrom and provided with terminal portions 28 to which the lead wires are connected. In this arrangement the circuit wire 1 is connected to contact 25 and the wires 3 to contacts 26 and 27. In the normal position of the parts with both circuits open the spring contact 17$^a$ lies to the right of the position shown in Fig. 6 with one end contacting with contact 26 only. The first movement to the left of bar 16 by actuation of either one of the vehicle control devices, moves contact 17$^a$ to the position shown, where wire 1 bridges the gap between the contacts 25 and 26, while the second movement to the left of bar 16 by actuation of both pedals, causes contact 17$^a$ to bridge the gap between the contacts 25, 27. It is unnecessary to insulate the casing of this switch from any portion of the vehicle frame.

Figs. 7, 8 and 9 show a switch provided with contacts similar in all respects to those shown in Figs. 2 and 3. The switch is provided with multiplying levers for actuating the equalizing lever 21 which is pivoted at its opposite ends to supplementary levers 29, the free ends of which extend outwardly through openings 30 forming abutments in the side wall of the switch casing. The springs 23 in this form are connected to the multiplying levers 29 midway between their ends, so that the free end of each multiplying lever serves as a fulcrum with a multiplication of about two to one. Fig. 7 shows one of the pull wires—the one at the top—pulled over to move the switch to its first position. The second movement, caused by the other pull wire, is obvious from the drawing. This arrangement has the advantage of producing full movement of the switch members with materially reduced motion of the control devices of the vehicle. It may be used with either the "live" or "dead" switches.

Figs. 10, 11 and 12 show another arrangement of switch of live form requiring insulation from the vehicle frame of the switch operating parts. The main circuit wire 1 is connected to a terminal at one end of bar 16, as before. Said bar carries a conducting spring contact 17$^b$ which cooperates with a contact 14$^b$ insulated from the casing and having a terminal 15$^b$ on the outside thereof. The transverse equalizing lever 21$^b$, in this form of the invention, serves not only as an actuating member for the switch, but also as a switch contact. This lever is in conducting relation with bar 16 and springs 23 are connected to said lever between its central pivot point 22$^b$ and the outer ends of its two arms. Whenever either spring is pulled the lever turns about the point of its connection to the other spring as a pivot, thereby moving the free end of the lever into contact with a flange 31 of an angle member 32 mounted in the casing and insulated therefrom and provided with a binding post 32$^b$. The two branch wires 3 of the circuit are connected respectively to the binding posts 32$^b$ and 15$^b$. Whenever either one of the pull wires is pulled over the lever 21 moves into engagement with the flange 31 and closes the first circuit to the first lamp 4. When both wires are pulled over spring contact 17$^b$ is advanced into cooperating relation with contact 14$^b$ thereby closing the second circuit to the second signaling lamp. This form of the invention, like that shown in Fig. 7, requires minimum movement of the control parts of the vehicle to actuate the signals.

All forms of switch shown can be made at low cost, are easily attached, are protected from the elements and are simple and effective in operation.

What I claim is:

1. Switch mechanism for vehicle stop signals, comprising a hollow casing, a slidable circuit controlling member therein, yielding means for moving the same in one direction, a lever pivotally connected between its ends to said sliding member and lying within said casing, and flexible members connected to the arms of said lever and extending outside of said casing for actuation by either or both of two vehicle control devices.

2. Switch mechanism for vehicle stop signals, comprising a hollow casing, a slidable member therein, an equalizing lever pivotally connected to said member and adapted for actuation by either of two vehicle control devices, and a contact carried by and movable with said slidable member for controlling a signal circuit.

3. Switch mechanism for vehicle stop signals, comprising a hollow casing carrying contacts adapted for connection to two signal circuits, a slidable member within said casing, means for yieldably moving the same in one direction, an equalizing lever pivoted to said sliding member and adapted for actuation by two vehicle control devices, and means whereby actuation of said lever and sliding member completes a circuit to one of said casing supported contacts.

4. Switch mechanism for vehicle stop signals, comprising a hollow casing, a movable member therein arranged to control two circuits, first named means within said casing and connected to said member, two separate means connected to said first named means for operation of the same by either or both of two vehicle control devices, said first named means upon operation being adapted to engage the casing for limitation of its movement.

In testimony whereof I hereby affix my signature.

LEE H. PECK.